United States Patent [19]

Thorndike

[11] Patent Number: 5,054,278
[45] Date of Patent: Oct. 8, 1991

[54] OPERATION OF LONG-HANDLED TOOLS

[76] Inventor: Charles E. Thorndike, P.O. Box 745, Meredith, N.H. 03253

[21] Appl. No.: 522,995

[22] Filed: May 14, 1990

[51] Int. Cl.⁵ .......................... A01D 1/02; A01D 7/00
[52] U.S. Cl. .................... 56/400.14; 37/121; 37/130; 56/400.04; 280/47.30; 294/59
[58] Field of Search .............. 37/121, 130; 254/131.5; 294/59; 56/400.04, 400.01, 400.14, 400.15; 280/47.30, 47.32, 47.23, 63, 47.1, 78, 652, 654

[56] References Cited

U.S. PATENT DOCUMENTS

| | | | |
|---|---|---|---|
| 237,410 | 2/1881 | Rouse | 37/121 |
| 462,918 | 11/1891 | Zabel | 294/59 X |
| 567,391 | 9/1896 | Hopper | 254/131.5 |
| 579,278 | 3/1897 | Mehlenbeck | 37/121 |
| 909,521 | 1/1909 | Bearinger | 37/121 X |
| 2,441,449 | 5/1948 | Shaw | 37/130 |
| 2,470,217 | 5/1949 | McLoughlin | 37/130 |
| 2,520,606 | 8/1950 | McLoughlin | 172/358 |
| 2,638,730 | 5/1953 | Davidson | 56/400.04 X |
| 2,769,612 | 11/1956 | Weisheit | 254/131.5 |
| 2,832,608 | 4/1958 | Martineau | 280/63 |
| 2,889,993 | 6/1959 | Willetts et al. | 280/63 X |
| 2,930,152 | 3/1960 | Pipkin | 37/130 |
| 3,748,761 | 7/1973 | Chetwynde | 37/130 |
| 3,952,490 | 4/1976 | Brockman | 56/400.14 |
| 4,009,560 | 3/1977 | Wells | 56/400.14 |
| 4,055,354 | 10/1977 | Sharpe | 280/78 X |
| 4,358,123 | 11/1982 | Richards | 56/400.14 |

FOREIGN PATENT DOCUMENTS 211484  5/1956  Australia ................... 172/358

Primary Examiner—George A. Suchfield
Attorney, Agent, or Firm—George E. Kersey

[57] ABSTRACT

Enhancement of the operability of a long-handled tool by mounting a wheel on an axle with a plurality of sleeves, which can at least partially encompass the axle; the sleeves are displaced from one another and are connected to sleeves on the handle of the tool; the connectors can be variably positioned with respect to the axle, which can be stabilized by a supplemental weight and include opposed and rotationally mounted wheels; in operating the tool with increased efficiency, the wheel is raised to control the operation of the tool at the end of the handle opposite the position where force is applied.

15 Claims, 4 Drawing Sheets

OPERATION OF LONG-HANDLED TOOLS

BACKGROUND OF THE INVENTION

This invention relates to long-handled tools and more particularly, to the enhanced operation of such tools.

A long-handled tool, such as a rake or shovel, is operated by the application of force to the handle of the tool. The length of the handle allows the tool to be operated at a position that is remote from the location where the force of the tool is applied.

As a result, it is often difficult to achieve precision control over the tool.

Accordingly, it is an object of the invention to increase the precision with which force can be applied to a long-handled tool.

In addition, long-handled tools are often bulky and difficult to move from one location to another. It is a further object of the invention to facilitate the movement of long-handled tools.

When the long-handled tool is a shovel, there may be difficulty in applying sufficient leverage in certain situations. Accordingly, it is another object of the invention to permit the application of increased leverage in various work situations.

Another objection with many long-handled tools is that they are difficult to carry and transport from one local site to another.

SUMMARY OF THE INVENTION

In accomplishing the foregoing and related objects the invention provides for enhancing the operability, of a long-handled tool by connecting a rotationally mounted member to the handle of the tool.

In accordance with one aspect of the invention a plurality of connectors can be used to join the rotationally mounted member to the handle of the tool. The rotational member can take the form of an axle with a plurality of rotationally mounted wheels. The wheels can be rotationally mounted on opposite ends of the axle.

In accordance with another aspect of the invention the connector for the rotationally mounted member is variably positionable on the handle of the tool. The connector is joinable to the handle of the tool by a sleeve or similar attachment which at least partially encompasses the handle.

In accordance with a further aspect of the invention the axle is an elongated rod having a circular cross-section and the connector is joinable to the axle by a sleeve which at least partially encompasses the circumference of the axle.

The long-handled tool can take a variety of forms, including a rake, a shovel, and other garden and utility tools. Also included are commercial hand tools.

In accordance with a method of enhancing the operability of a long-handled tool, a rotationally mounted wheel is connectable to the handle of the tool. The handle of the tool can be connected to a plurality of wheels rotationally mounted on an axle. The position of the rotationally mounted wheels can be adjusted with respect to the handle of the tool. Similarly, the position of the rotationally mounted wheels can be adjusted with respect to their axle.

The long-handled tool can be provided in the form of a rake, a shovel, or a similar garden or utility tool.

In a method of operating a long-handled tool with increased efficiency, a rotational member is affixed to the handle of the tool and the member is used to control the operation of the tool at the end of the handle opposite the position where force is applied for the use of the tool.

When the long-handled tool is a rake, force applied at one end of the handle is controlled with respect to the head end of the rake. Similarly, when the long-handled tool is a shovel, force applied at one end of the handle is controlled with respect to the head end of the shovel, and the member can serve as a fulcrum for the head of the shovel.

DESCRIPTION OF THE DRAWINGS

Other aspects of the invention will become apparent after considering several illustrative embodiments taken in conjunction with the drawings in which.

DETAILED DESCRIPTION

Figure 1:
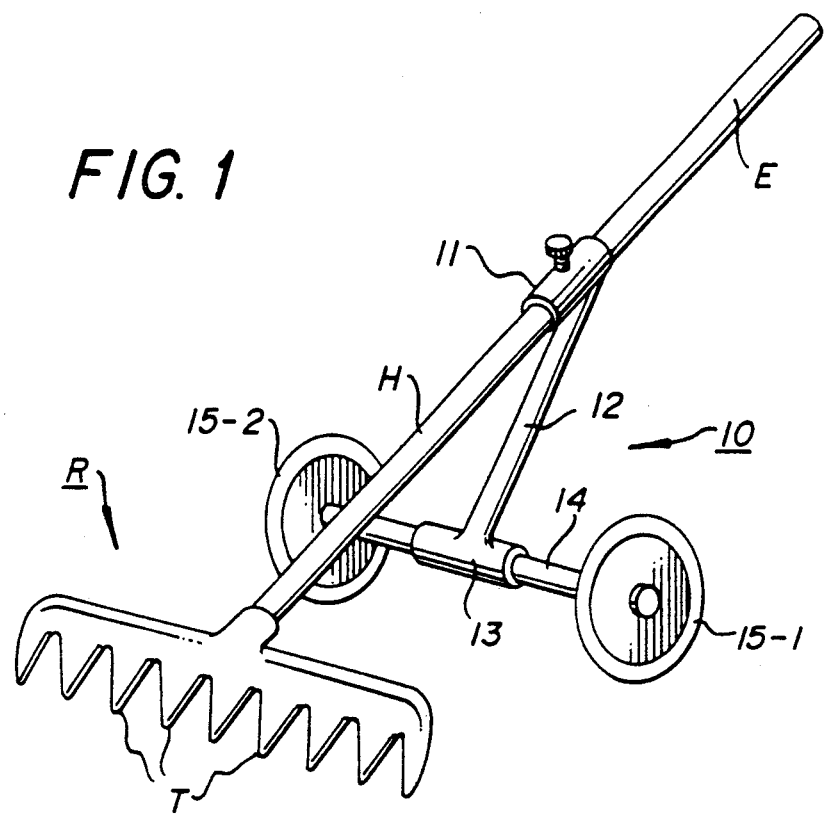
FIG. 1 is a perspective view of a rake which has been adapted for enhanced operability in accordance with the invention.

With reference to the drawings, FIG. 1 shows a rake R which has been adapted by the inclusion of a wheeled accessory 10 that is affixed to the handle H of the rake R by a connector 11. The connector is joined by a flange 12 to a sleeve 13 on an axle 14. The axle rotationally mounts wheels 15-1 and 15-2. When raking force is applied at the end E of the handle H, precision control is afforded over the tines T at the head end of the rake R. The arrangement of FIG. 1 facilitates, for example, the spreading of crushed stones in a driveway and general raking operations.

Figure 2:
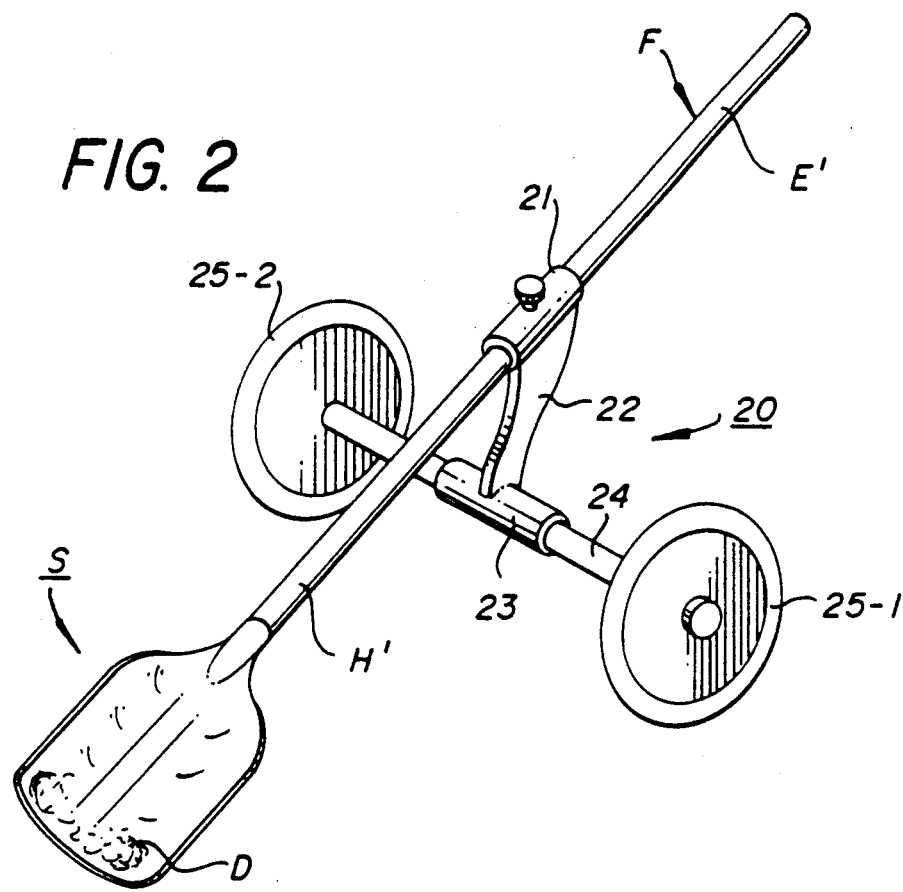
FIG. 2 is a perspective view of an arrangement in accordance with the invention for enhancing the operability of a shovel.

An alternative embodiment of the invention is shown in FIG. 2 for use with a shovel S having a handle H' affixed to an accessory 20. The latter permits the shovel S to be moved easily from one location to another and facilitates digging operations with the head D of the shovel S. The accessory 20 is formed by sleeve 21 that extends by a rod 22 to a second sleeve 23 on an axle 24. The axle, in turn, mounts oppositely positioned wheels 25-1 and 25-2. When force is applied at the end E' of the handle H', the accessory 20 provides a fulcrum for the head D about the axle 24. The sleeve 21 is adjustable along the length of the handle H' to control the mechanical advantage afforded by the fulcrum.

Figure 3:
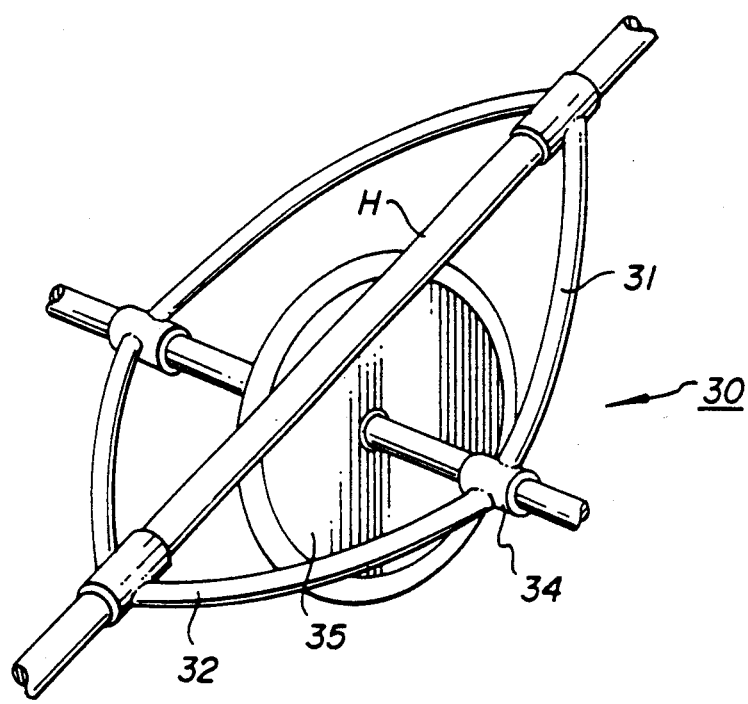
FIG. 3 is a single wheel adaptation for attachment to a handle.

A further modification of the invention is shown in FIG. 3 where an accessory 30 in accordance with the invention is used with a single wheel 35 mounted on an axle 34. The axle is joined to a handle H by spanners 31 and 32. Each of the spanners 31 and 32 has one end joined to a sleeve on the handle H and their other ends connected to the axle 34.

Figure 4:
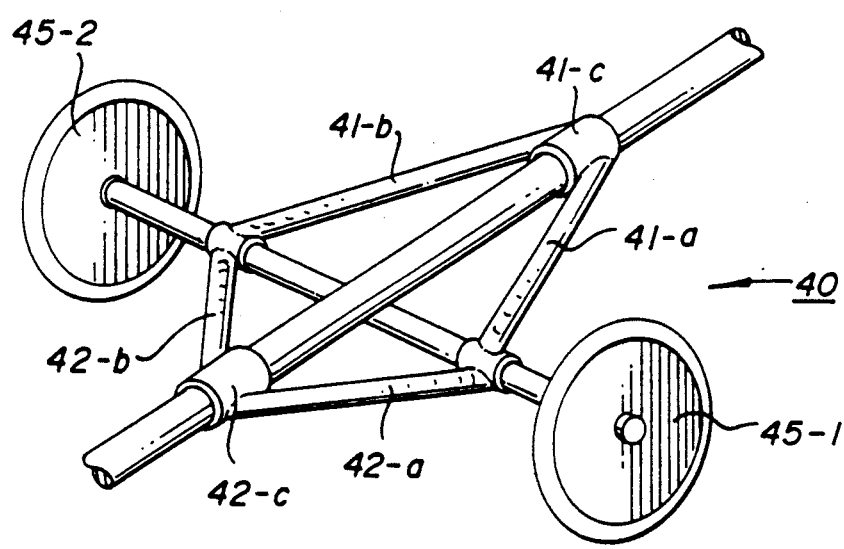
FIG. 4 is an alternative adaptation of the invention with respect to a long-handled implement.

A further adaptation is shown in FIG. 4 where the accessory 40 employs oppositely position wheels 45-1 and 45-2 rotationally mounted on an axle 44. A spanner 41 has arms 41-a and 41-b that extend from the axle to a collar 41-c. Similarly a second spanner 42 has arms 42-a and 42-b that extend from the axle 44 to an adjustable collar 42-c.

Figure 5:
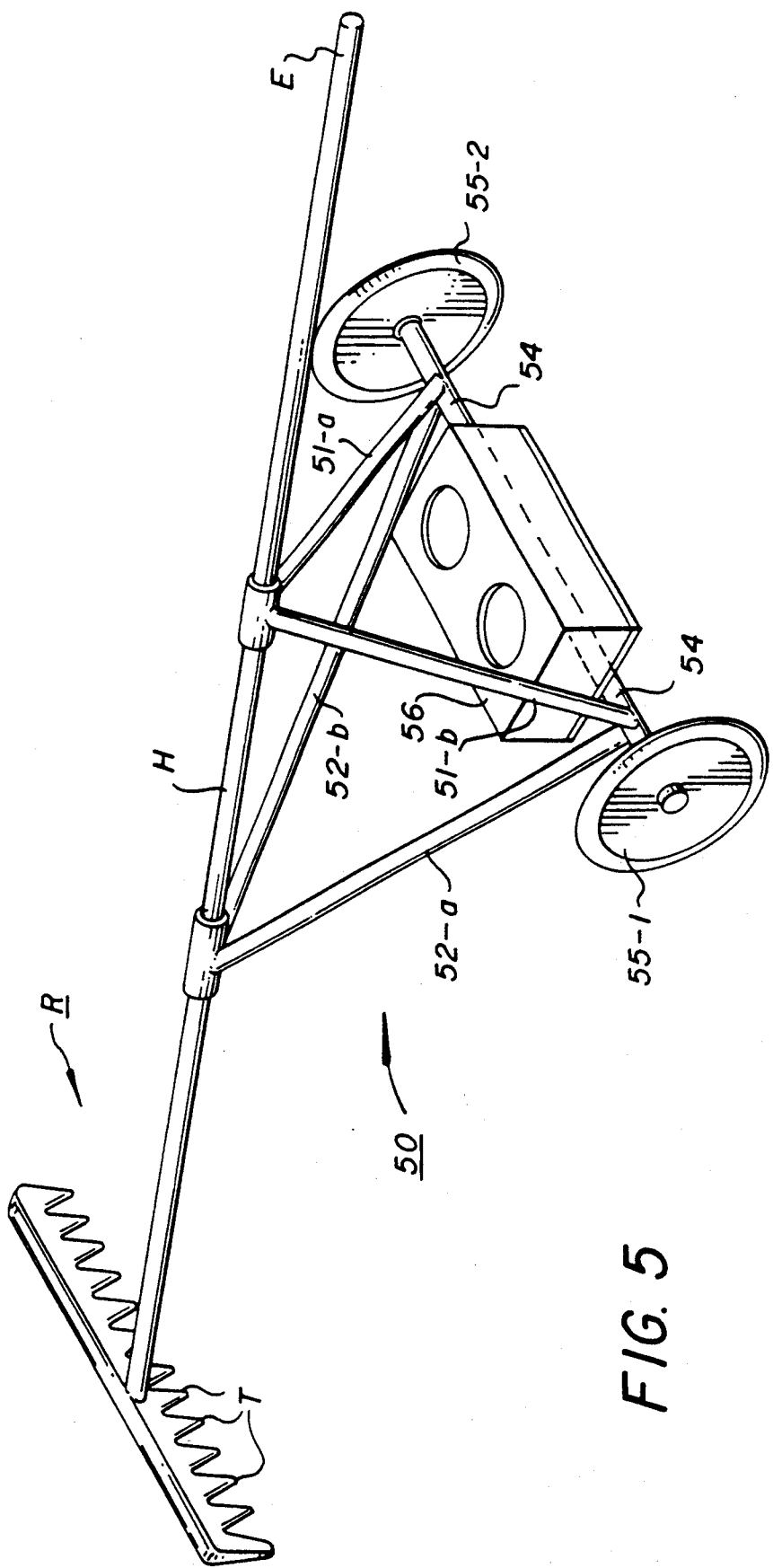
FIG. 5 is a perspective view showing a further adaptation of the invention.

Still another adaptation of the invention is shown in FIG. 5 where the accessory 50 includes a stabilizing member 56 on an axle 54. The stabilizing member 56 is used to provide additional weight in order to permit the physical effort applied to the combination tool and accessory to be primarily directed to pulling and lifting. For that purpose the stabilizing member 56 can take the form of a cement block which is adhered to the axle 54 in conventional fashion.

Figure 6:
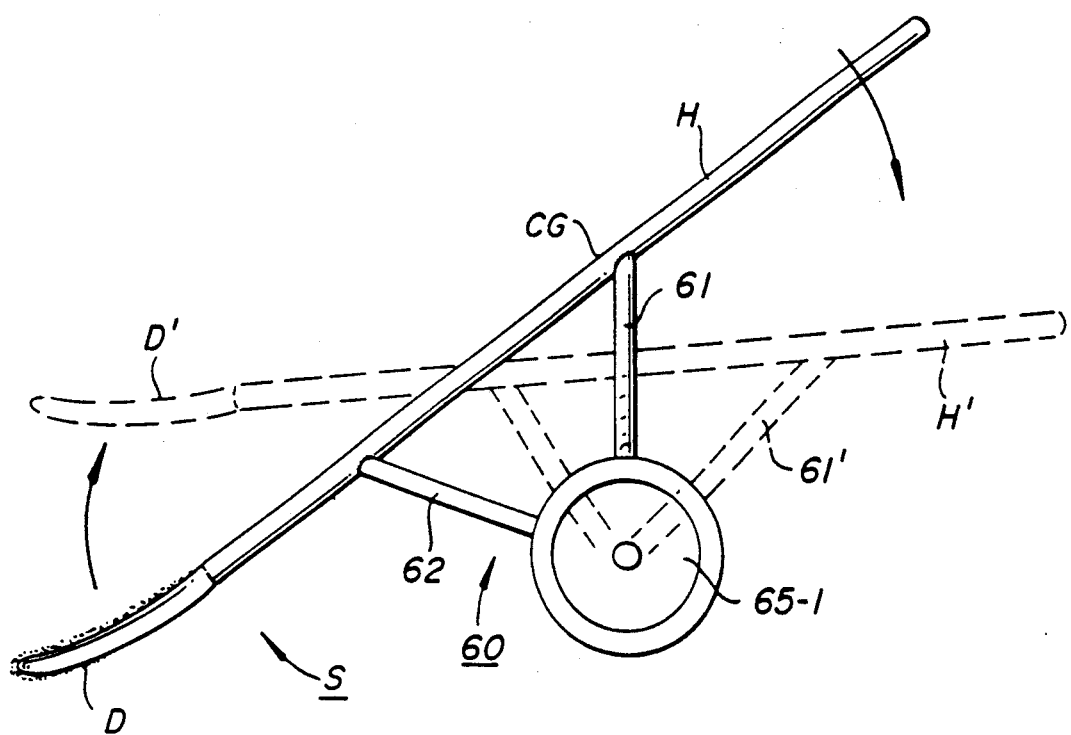
FIG. 6 is a side view illustrating use of the invention.

An illustration of a suitable technique for using the invention is shown in FIG. 6 where the accessory 60 has a connecting member 61 secured to the handle H of the shovel S at the center of gravity (CG) of the tool. This allows the connector 61 to be substantially vertical when the head D of the shovel is inserted against a load preparatory to a shoveling action. Thereafter, when suitable force is applied to the handle it is pushed downwardly to approximately the position shown in phantom.

Other uses and adaptations of the invention, including adjustments of the accessory with respect to handles and axles, will be readily apparent to those of ordinary skill in the art.

What is claimed is:

1. Apparatus for enhancing the operability of a long-handled tool, comprising
   a wheel rotationally mounted on an axis;
   a first plurality of sleeves displaced from one another on said axle;
   a second plurality of sleeves displaced from one another on said handle; and
   means for connecting the sleeves of said axle to the sleeves on said handle of said tool.

2. Apparatus as defined in claim 1 wherein the connecting means comprises a plurality of connectors joining each sleeve of said axle to each sleeve on the handle of said tool.

3. Apparatus as defined in claim 1 wherein said axle includes a plurality of wheels rotationally mounted on opposite ends of said axle beyond each of the sleeves on said axle.

4. Apparatus as defined in claim 1 wherein the connecting means is variably positionable on the axle of said tool.

5. Apparatus as defined in claim 1 wherein said axle is an elongated rod having a circular cross-section and the connecting means is joinable to said axle by said second plurality of sleeves which at least partially encompass the circumference of said axle.

6. Apparatus for enhancing the operability of a long-handled tool, comprising
   a wheel rotationally mounted on an axle;
   means for connecting said axle to the handle of said tool, wherein the connecting means comprises a plurality of connectors joining said axle to the handle of said tool; and
   means mounted on said axle for the stabilization thereof, which comprises a supplemental weight secured to said axle.

7. Apparatus as defined in claim 6 wherein said axle includes a plurality of wheels rotationally mounted thereon, and the weighting means comprises a member with voids over said axle in order to provide a moment of inertia with respect to said axle.

8. Apparatus as defined in claim 7 wherein said wheels are rotationally mounted at opposite ends of said axle and said weighting means is positioned on said axle between said wheels.

9. The method of claim 6 including the further step of adjusting the position of said rotationally mounted wheels with respect to the handle of said tool by the movement of the sleeves on said handle.

10. The method of enhancing the operability of a long-handled tool, comprising the steps of:
    (a) providing a long handled tool;
    (b) affixing to the handle of said tool a plurality of sleeves displaced from one another;
    (c) providing an axle with a plurality of sleeves displaced from one another, and rotationally mounting a plurality of wheels; and
    (d) connecting to the sleeves on said handle said wheels rotationally mounted on said axle by said sleeve on said axle.

11. The method of claim 10 including the further step of providing said long-handled tool in the form of a rake and stabilizing said axle by a supplemental weight attached thereto.

12. The method of claim 10 including the further step of providing said long-handled tool in the form of a shovel and stabilizing said axle by a supplemental weight attached thereto.

13. The method of operating a long-handled tool with increased efficiency, comprising the steps of:
    (a) providing a long-handled tool;
    (b) affixing to the handle of said tool a plurality of sleeves disposed from one another;
    (c) connecting to the sleeves of said handle a wheel rotationally mounted on an axle; and
    (d) using said wheel to control the operation of said tool at the end of said handle opposite the position where force is applied for the use of said tool;
    wherein said long-handled tool is a rake and force applied at one end of said handle is controlled with respect to the head end of said rake.

14. The method of claim 13 wherein said wheel serves as a fulcrum for the head of said tool.

15. The method of claim 13 wherein said wheel is affixed to said tool at the center of gravity thereof.

* * * * *